UNITED STATES PATENT OFFICE.

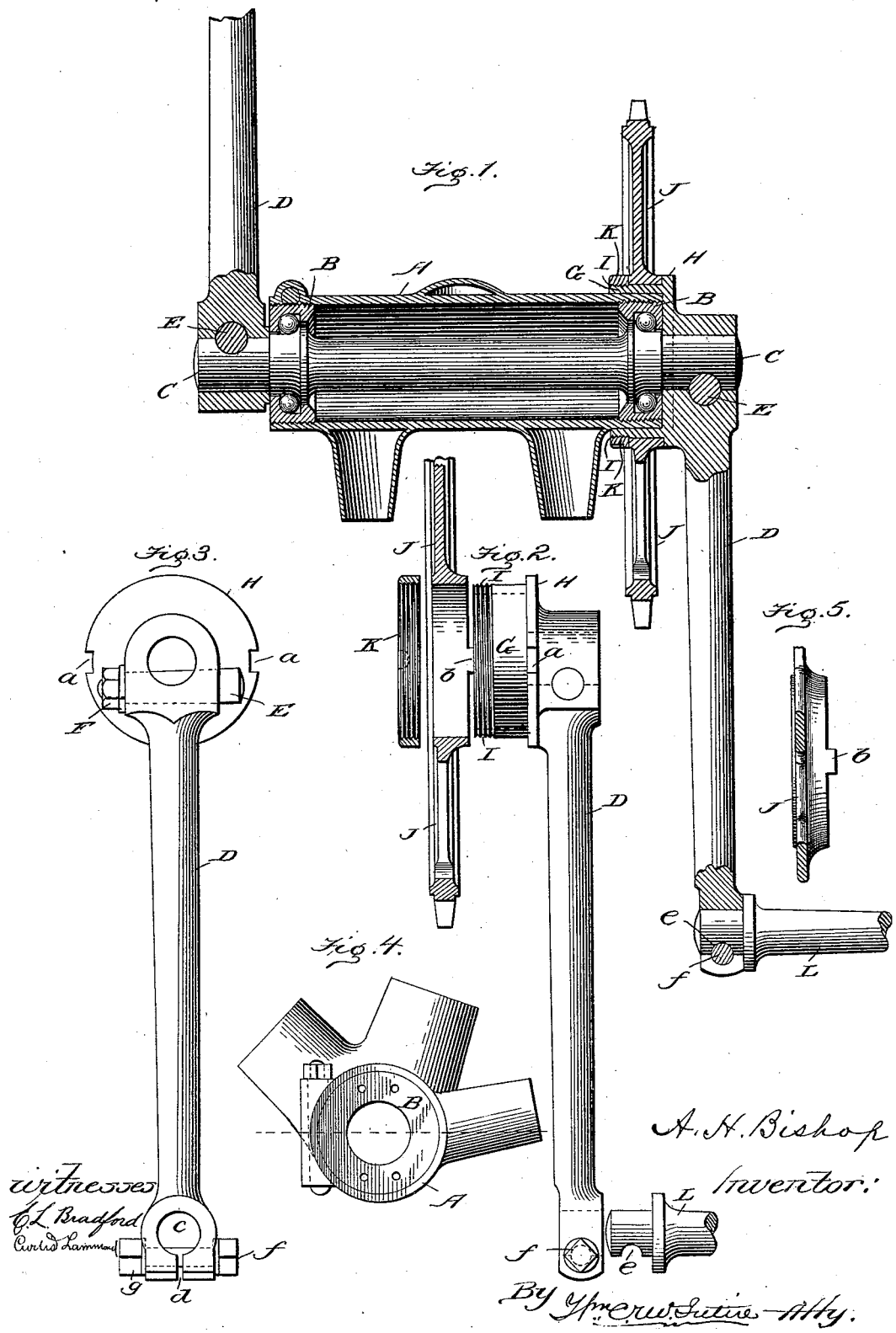

ALFRED H. BISHOP, OF TOLEDO, OHIO, ASSIGNOR TO THE SNELL CYCLE FITTINGS COMPANY, OF SAME PLACE.

BICYCLE.

SPECIFICATION forming part of Letters Patent No. 521,363, dated June 12, 1894.

Application filed September 25, 1893. Serial No. 486,362. (No model.)

*To all whom it may concern:*

Be it known that I, ALFRED H. BISHOP, a subject of the Queen of Great Britain, residing at Toledo, in the county of Lucas and State of Ohio, have invented certain new and useful Improvements in Bicycles; and I do hereby declare the following to be a full, clear, and exact description of the invention, such as will enable others skilled in the art to which it appertains to make and use the same.

My invention relates to certain new and useful improvements in bicycles, and especially to that class in which a sprocket wheel and drive chain are employed to transmit the power applied to the drive shaft.

My invention has for its object to securely connect the sprocket wheel with the crank or drive-shaft in a simple and efficient manner, and so as to secure protection of the ball bearing from dust and dirt and to bring said bearing outwardly to or beyond the chain line, as will be hereinafter explained.

My invention also has for its object to provide a novel means of securing the pedals to the cranks in an expeditious and safe manner as will be fully explained; and with these objects in view my invention consists of the novel construction and arrangement of parts illustrated by the drawings and specifically described.

To enable others skilled in the art to make and use my invention I will proceed to describe the construction and arrangement of the same, referring by letters to the accompanying drawings, in which—

Figure 1 represents a vertical central section of a ball yoke and crank hanger with my improvements shown therein. Fig. 2 represents the crank in elevation, and the sprocket wheel and securing screw ring in section. Fig. 3 represents a side elevation of the crank; Fig. 4 an end view of the crank hanger ball yoke; and Fig. 5 is a side elevation of the hub of the sprocket wheel showing locking lugs thereon.

Similar letters of reference denote like parts in the several figures of the drawings.

A is the yoke which is adapted to be secured to the frame of the machine in the usual manner, and provided with ball races B adapted to be screwed into the ends of the tubular yoke, as clearly shown at Fig. 1. The crank shaft C is sustained within the yoke and ball race, as clearly shown, and with the ends projecting and upon which the cranks D are secured by the screw bolts E and nuts F. One of the cranks is formed with hollow bosses G having a circumferential flange H and screw threaded on the inner end as seen at I (Fig. 1). The flange H at one or more points, (but preferably at two points diametrically opposite) is provided with slots *a* (see Figs. 2 and 3) to receive corresponding projections *b* formed upon the hub of the sprocket wheel J (see Fig. 5).

K is a screw ring for securing the sprocket wheel in place after it has been placed in interlocking position over the boss G of the crank D, as clearly shown at Fig. 1. It will be seen that the exterior diameter of the boss G and the interior diameter of the hub of the sprocket wheel J are such that the boss G can pass through the hub of the sprocket wheel and that the lugs or projections *b* thereon can be located within the slots *a* in the flange H of the boss G, and the parts secured in such position by the screw ring K in an obvious manner as illustrated at Figs. 1 and 2, and when so secured and the crank in turn secured as before described to the crank shaft C, the sprocket wheel must rotate with said shaft, and it will be observed that by the construction and arrangement described the sprocket wheel is enabled to assume a position over the ball race, and it together with the hollow boss of the crank fully protects the ball race from dust and dirt, and enables the ball bearings to be extended outside the chain line, thus making the whole much more rigid than the ordinary form of yokes. This construction as will be understood enables the manufacturer or rider or any inexperienced person to readily change the gears of a machine to suit all conditions of riding.

The pedal ends of the cranks D are bored out as seen at *c* to receive the end of the pedal pin and split at *d* to form a clip. The end of the pedal pin is formed with a transverse groove *e* and the pedal clip is provided with a removable bolt *f* and nut *g*, so that when the pedal pin is arranged in place within the clip and the bolt *f* inserted, the clip is tightened around the pedal pin and also traverses the groove *e* therein, and thus firmly secures the parts in position.

Having fully described my invention, what I claim as new, and desire to secure by Letters Patent, is—

1. In combination with the yoke A and shaft C, the crank D with boss G and slotted flange H, the sprocket wheel J with hollow hub provided with lugs or keys *b* and the securing screw ring K, substantially as and for the purposes set forth.

2. The crank formed with the hollow boss G and slotted flange H, in combination with the sprocket wheel J having a hollow hub provided with lugs or keys *b* adapted to interlock with the boss, substantially as and for the purposes set forth.

In testimony whereof I affix my signature in presence of two witnesses.

ALFRED H. BISHOP.

Witnesses:
   CHAS. W. BOND,
   HAROLD W. FRASER.